United States Patent [19]

Schaper et al.

[11] 4,400,286

[45] Aug. 23, 1983

[54] HEAT STORAGE MATERIALS SUITABLE IN PARTICULAR FOR INDOOR AIR COOLING

[76] Inventors: Peter Schaper, Am Remsufer 8/4, D 7148 Remseck-1; Oliver Laing, Hofenerweg 37, D 7148 Remseck-2, both of Fed. Rep. of Germany

[21] Appl. No.: 225,417

[22] Filed: Jan. 15, 1981

[30] Foreign Application Priority Data

Jan. 19, 1980 [DE] Fed. Rep. of Germany ....... 3001903

[51] Int. Cl.$^3$ ................................................ C09K 5/06
[52] U.S. Cl. ........................................ 252/70; 165/10; 165/104.17
[58] Field of Search .......... 252/70; 165/10 A, 104.17; 126/400

[56] References Cited

U.S. PATENT DOCUMENTS

| | | | |
|---|---|---|---|
| 1,656,366 | 1/1928 | Sterling et al. | 252/70 |
| 2,677,664 | 5/1954 | Telkes | 252/70 |
| 3,869,870 | 3/1975 | Kuehner | 165/104.17 |
| 3,913,559 | 10/1975 | Dandliker | 126/263 |
| 3,986,969 | 10/1976 | Telkes | 252/70 |
| 4,231,885 | 11/1980 | Rueffel | 252/70 |
| 4,267,879 | 5/1981 | Herrick | 252/70 X |
| 4,287,076 | 9/1981 | Babin | 252/70 |
| 4,292,189 | 9/1981 | Chen | 252/70 |
| 4,332,690 | 6/1982 | Kai | 252/70 |

FOREIGN PATENT DOCUMENTS 2753598 6/1979 Fed. Rep. of Germany ........ 252/70

*Primary Examiner*—Dennis L. Albrecht
*Attorney, Agent, or Firm*—Pennie & Edmonds

[57] ABSTRACT

The use of $Na_2CrO_4.10\ H_2O$ as a heat storage medium is disclosed. Various amounts of $Na_2SO_4.10\ H_2O$ may be included to provide a melting temperature between 19° C. and 31.9° C. A lower melting temperature can be obtained by adding $CO(NH_2)_2$. Paper sludge or waste products from the processing of sugar cane or peat can be added to increase viscosity. Auxiliary liquids such as trichlorethylene and tetrachlorethylene or silicone oils can be added to maintain pumpability of the compositions.

1 Claim, No Drawings

HEAT STORAGE MATERIALS SUITABLE IN PARTICULAR FOR INDOOR AIR COOLING

The invention relates to heat storage materials suitable in particular for indoor air cooling.

The greater part of humanity lives in climatic regions in which daytime temperatures during the hours of insolation are so high that physiologically optimal indoor temperatures can only be attained by artificial cooling. The primary energy requirements for that purpose are by comparison greater than for heating, since mechanical cooling plants can only be operated with mechanical energy, the generation of which requires a multiple thereof in primary energy.

An object of the invention resides in the absorbance of excess indoor heat. For this purpose such excess heat is introduced into heat storage devices which as a storage material contain crystalline substances which melt at a temperature below the physiologically optimal room temperature and which at the melting temperature, absorb the excess heat. By this process it is possible to continuously withdraw heat from the indoor air without the effectiveness of the thermal storage means lessening until it has been charged up completely. As soon as the environmental temperature drops below the crystallisation temperature of the storage means in the evening or at night, the heat stored during the day is passed to the outdoor air in the form of heat of crystallisation or is radiated off, permitting the cooling procedures to commence anew on the next following day.

For carrying out this process, the crystalline masses are stored in vessels of large surface area, the surfaces of which are subjected to heat exchange with flowing air or another fluid. Temperatures between 18° C. and 26° C. were found to be suitable crystallisation temperatures. So far no crystallising material has been known for that temperature range. The primary requirement is accordingly directed to those particular melting and crystallisation temperatures.

The invention teaches the obtaining of storage materials which crystallise in that temperature range and which can be changed many times from the liquid into the solid state and vice versa.

A second requirement for storage materials enclosed in vessels of large surface area, is a volume constancy when changing from one phase into the other. Whilst almost all previously meltable storage materials are subject to expansion when melting (e.g. KOH approximately 28%), water experiences a contraction of 10% when melting. All storage materials which suffer a volume change, are unsuitable for air conditioning purposes where the storage vessels simultaneously take the form of heat transfer fins. For attaining indoor cooling on a technical scale with the use of latent heat storage materials a substantial volume constancy is therefore necessary. According to the invention this can be attained with hydrates in which a substantial part of the storage material is provided by water of crystallisation.

The third requirement relates to the preservation of the capacity. In the past hydrates could not make the grade as storage materials, because it was found that hydrates are subject to ageing. Any salt which forms hydrate can do so with variable numbers of hydration molecules based on the anhydrous substance. However, crystals having different numbers of hydration molecules will melt at different temperatures, so that in due course, the crystallisation temperatures of such storage means will change, causing the capacity at the desired temperature to drop or even be reduced to zero.

The fourth requirement concerns the compatibility of the storage material with the material of which the vessel is made. For storage materials which are enclosed in flat vessels of large surface area, no vessel materials other than sheet metal or plastics are suitable. Accordingly, only such chemicals are suitable which are inert towards iron and aluminium or against plastics capable of being blow-moulded or extrusion-moulded.

It was surprisingly found that the substances described in the following comply with all the above requirements:

In the following percentages are given in terms of mass percentages.

1. A first substance according to the invention is composed of
   36,45% by weight of $Na_2CrO_4$
   44,55% by weight $H_2O$
   10-15% by weight moisture-expandible cellulose
   4-9% by weight of one or more substances selected from the group $C_2H$ (according to Schoenflies), e.g. $Na_2B_4O_7.10H_2O$ and/or $Na_2SO_4.10H_2O$.

A particularly economical mixture of substances according to the invention is produced with paper sludge which is obtained as an unavoidable waste product in paper manufacture. Such paper sludges, besides cellulose invariably contain one or more inorganic substances from the group $BaSO_4$, $Al_2O_3$, $CaCO_3$ and $TiO_2$. In this context paper sludge is intended to denote the waste product which is formed in the manufacture of paper and which is obtained in the effluent treatment plant. Instead of the paper sludges it is also possible to use a paper pulp which is produced in the processing of reclaimed paper. Products from the processing of sugar cane, peat and straw are suitable to be used in place of pure cellulose.

Further embodiments are:

2. The following are mixed in cooled mixers at temperatures below 55° C., the reaction heat being dissipated:
   9,3% by weight NaOH
   34,6% by weight $Na_2Cr_2O_7.2H_2O$
   33,1% by weight sludge from paper manufacture, the solids content is composed of about 60% cellulose fibre in addition to the inorganic admixtures of paper, in particular one or more from the group of the following substances: $BaSO_4$, $Al_2O_3$, $TiO_2$ $CaCO_3$
   19,2% by weight $H_2O$
   3,8% by weight $Na_2B_4O_7.10H_2O$.

After the dissipation of the reaction heat the described mass has a heat capacity of 130 kJ/kg. The density is 1,5 kg/l. The material has a crystallisation temperature between 18° C. and 19° C. These values do not change even after 6000 loading and discharge cycles. The volume change, when passing from one phase to the other, is immeasurably small. The material does not attack iron, aluminium or plastics.

3. 40,8% by weight $Na_2CrO_4$ are dissolved in a homogeneous pulp composed of
   31,7% by weight very finely comminuted sugar cane sludge
   23,3% by weight water with cooling of the mixing vessels so that the temperature of the mixed material does not exceed 55° C., and 4,2% by weight $Na_2B_4O_7.10H_2O$ are stirred homogeneously into the homogenised mass with cooling to 50° C.

4. 6,7% by weight dried paper sludge obtained by the processing of reclaimed paper are homogeneously mixed with stirring into 89,4% weight of a melt of $Na_2CrO_4.10H_2O$ at a temperature between 35° C. and 50° C. and 3,4% by weight $Na_2B_4O_7.10H_2O$ and 0,5% by weight $Na_2SO_4.10H_2O$ and 0,89 Mol $H_2O$ (based on $Na_2CrO_4.10H_2O$) are then added with agitation.

5. 10,6 weight % NaOH are dissolved with cooling in the paper sludge-water slurry composed of 31,1 weight % paper sludge and 17,1 weight % $H_2O$. 39,3 weight % $Na_2Cr_2O_7.2H_2O$ are then slowly added with cooling. During these process steps the temperature must not exceed 60° C. After the mass has been agitated to homogenuity and been cooled to a temperature below 50° C., 3 weight % $Na_2B_4O_7.10H_2O$ or $Na_2SO_4.10H_2O$ are added with agitation.

6. 11,4 weight % NaOH are dissolved in 17,7 weight % $H_2O$. The heat of solution is dissipated at the same time. 33,6 weight % paper sludge are stirred into the cooled solution. This is followed by the slow addition, with cooling, of 32,7 weight % $Na_2Cr_2O_7.2H_2O$ whilst the temperature is not allowed to rise above 55° C. After cooling below 50° C. 4,6 weight % $Na_2B_4O_7.10H_2O$ are mixed into the mass.

In all procedures the mixture at the stage of addition of the moisture-swellable cellulose is to be alkaline because the moisture swelling properties are increased thereby.

The melting temperature of the storage material can be increased by the addition of $Na_2SO_4.10H_2O$. In this manner any temperature between 19° C. and 31,9° C. is attainable.

The melting temperature can, however, be lowered in accordance with the invention. This is done by the addition of $CO(NH_2)_2$, an addition of 1% resulting in a temperature lowering of about 1,2 K., whilst 2% result in a temperature drop of about 2,3 K.

The addition of the paper sludge or of the aforesaid wastes from sugar cane or straw processing or of ground peat, renders the storage material sufficiently viscous to avoid the separation of the individual components of variable densities.

If conditions permit a prevention of the separation of the components by shaking or recycle pumping of the storage material, a mixture may be used composed of 7. $Na_2CrO_4 + 10$ Mol $H_2O$ To this mixture insoluble crystals of the group $C_{2h}$ according to the crystal structure system according to Schoenflies, and having a meltintg point of more than 30° C., are added. The finer the crystals are the less are the amounts required. 0,1 to 1% are sufficient.

Additional water, preferably 0,98 Mol is added to the moisture. This method of adding more water to the anhydrate than is necessary for the formation of the desired hydrate has also proved to be an effective expedient in storage materials for different temperatures in order to suppress undesirable hydrates or of the crystallisation of anhydrate. The application of this expedient is accordingly not restricted to $Na_2CrO_4$ but can also be applied to other storage media, e.g. sodium acetate.

The melt has such a low viscosity that it can easily be recycled by pumping with little hydraulic pump capacity in order to maintain the homogenuity and increase the heat transfer to the walls. However, the advantageous heat transfer during pumping recycling of the liquid storage material only arises during heat absorption, whilst during heat dissipation the crystallised layer of storage material must be traversed by the heat flow. However, if the heat transfer is to be improved also during the discharge, it will be necessary for the storage material to remain pumpable, even in its crystallised state. According to the invention this is possible by the addition to the melt of an auxiliary liquid which has the same density as the melt, but which is immiscible with the melt. In order to attain this density, this auxiliary liquid can also be composed of a plurality of mutually mixable components. For example a mixture composed of about 2 parts by weight trichloraethylene and 1 part by weight tetrachloraethylene is suitable as an auxiliary liquid for the storage material according to 7. An amount of 10% by volume based on the melt of the storage material makes possible a pumped recycling until about 90% of the latent heat has been withdrawn. If the proportion of auxiliary liquid is further increased, the storage material will even remain capable of being recycled by pumping until a complete discharge has taken place. The chlorinated hydrocarbons can also be replaced by other liquids which are immiscible with storage material, e.g. silicone oils as well as any hydrocarbons containing chlorine, bromine or fluorine. This method as well is not restricted to chromium salts but can also be applied to numerous other storage materials (e.g. sodium acetate).

Moreover, the application of the storage material according to the invention is not limited to processes and apparatus for indoor cooling. The new storage material is, for example, also suitable for the absorption of the heat of an energy roof during daytime and for feeding the heat to a heat pump during night time.

We claim:

1. Storage material for storing latent heat, characterized in that said material contains a mixture of $Na_2CrO_4$, at least 10 Mol $H_2O$ for every Mol $Na_2CrO_4$, an amount of $Na_2SO_4.10H_2O$ sufficient to raise the melting temperature of the mixture to a desired level between 19° C. and 31.9° C., and 6.7–33.6% by weight of a paper sludge.

* * * * *